United States Patent
Hundemer et al.

(10) Patent No.: US 10,462,415 B2
(45) Date of Patent: *Oct. 29, 2019

(54) SYSTEMS AND METHODS FOR GENERATING A VIDEO CLIP AND ASSOCIATED CLOSED-CAPTIONING DATA

(71) Applicant: Tribune Broadcasting Company, LLC, Chicago, IL (US)

(72) Inventors: Hank J. Hundemer, Bellevue, KY (US); Dana A. Lasher, Morgan Hill, CA (US)

(73) Assignee: Tribune Broadcasting Company, LLC, Chicago, IL (US)

( * ) Notice: Subject to any disclaimer, the term of this patent is extended or adjusted under 35 U.S.C. 154(b) by 179 days.

This patent is subject to a terminal disclaimer.

(21) Appl. No.: 15/791,192

(22) Filed: Oct. 23, 2017

(65) Prior Publication Data

US 2018/0048855 A1 Feb. 15, 2018

Related U.S. Application Data

(63) Continuation of application No. 15/002,792, filed on Jan. 21, 2016, now Pat. No. 9,838,644, which is a
(Continued)

(51) Int. Cl.
*H04N 7/088* (2006.01)
*H04N 9/87* (2006.01)
(Continued)

(52) U.S. Cl.
CPC ....... *H04N 7/0885* (2013.01); *G06K 9/00744* (2013.01); *G06K 9/00765* (2013.01);
(Continued)

(58) Field of Classification Search
CPC .............. H04N 7/0885; H04N 9/8715; H04N 21/47205; H04N 21/4884; H04N 21/4307;
(Continued)

(56) References Cited

U.S. PATENT DOCUMENTS 9,277,199 B2 * 3/2016 Hundemer ........... H04N 9/8715
9,838,644 B2 * 12/2017 Hundemer ........... H04N 9/8715
(Continued)

*Primary Examiner* — Thai Q Tran
*Assistant Examiner* — Nienru Yang
(74) *Attorney, Agent, or Firm* — McDonnell Boehnen Hulbert & Berghoff LLP

(57) ABSTRACT

Disclosed herein are systems and methods for generating a video clip and associated closed-captioning (CC) data. An example method involves accessing a first video clip demarcated into frames; accessing CC data demarcated into CC blocks, identifying a starting frame from among the frames; determining a first set of frames that are within a range of the starting frame; determining a first set of CC blocks that correlate to the first set of frames; receiving a selection of a starting position from among the first set of CC blocks; identifying an ending frame among the frames; using the ending frame to identify an ending position; and generating a second video clip and associated CC data, wherein the second video clip includes the frames spanning from the starting frame to the ending frame, and wherein the generated CC data includes the CC blocks spanning from the starting position to the ending position.

20 Claims, 5 Drawing Sheets

Related U.S. Application Data continuation of application No. 13/834,002, filed on Mar. 15, 2013, now Pat. No. 9,277,199.

(51) Int. Cl.

| | | |
|---|---|---|
| *H04N 21/43* | (2011.01) | |
| *H04N 21/472* | (2011.01) | |
| *H04N 21/488* | (2011.01) | |
| *G06K 9/00* | (2006.01) | |
| *H04N 5/445* | (2011.01) | |

(52) U.S. Cl.
CPC ....... *H04N 9/8715* (2013.01); *H04N 21/4307* (2013.01); *H04N 21/47205* (2013.01); *H04N 21/4884* (2013.01); *H04N 2005/44526* (2013.01)

(58) Field of Classification Search
CPC ......... H04N 2005/44526; H04N 7/088; G06K 9/00744; G06K 9/00765; G06K 9/00
USPC ....................................................... 348/465
See application file for complete search history.

(56) References Cited

U.S. PATENT DOCUMENTS

| | | | |
|---|---|---|---|
| 2009/0133092 A1* | 5/2009 | Casagrande | G11B 27/105 725/137 |
| 2010/0183278 A1* | 7/2010 | Black | G11B 27/034 386/278 |
| 2011/0050995 A1 | 3/2011 | Ozawa et al. | |
| 2012/0301112 A1 | 11/2012 | Wallace | |
| 2013/0011121 A1* | 1/2013 | Forsyth | G11B 27/034 386/245 |
| 2013/0051764 A1 | 2/2013 | Casagrande | |
| 2014/0044413 A1* | 2/2014 | Wallace | H04N 9/8205 386/278 |

* cited by examiner

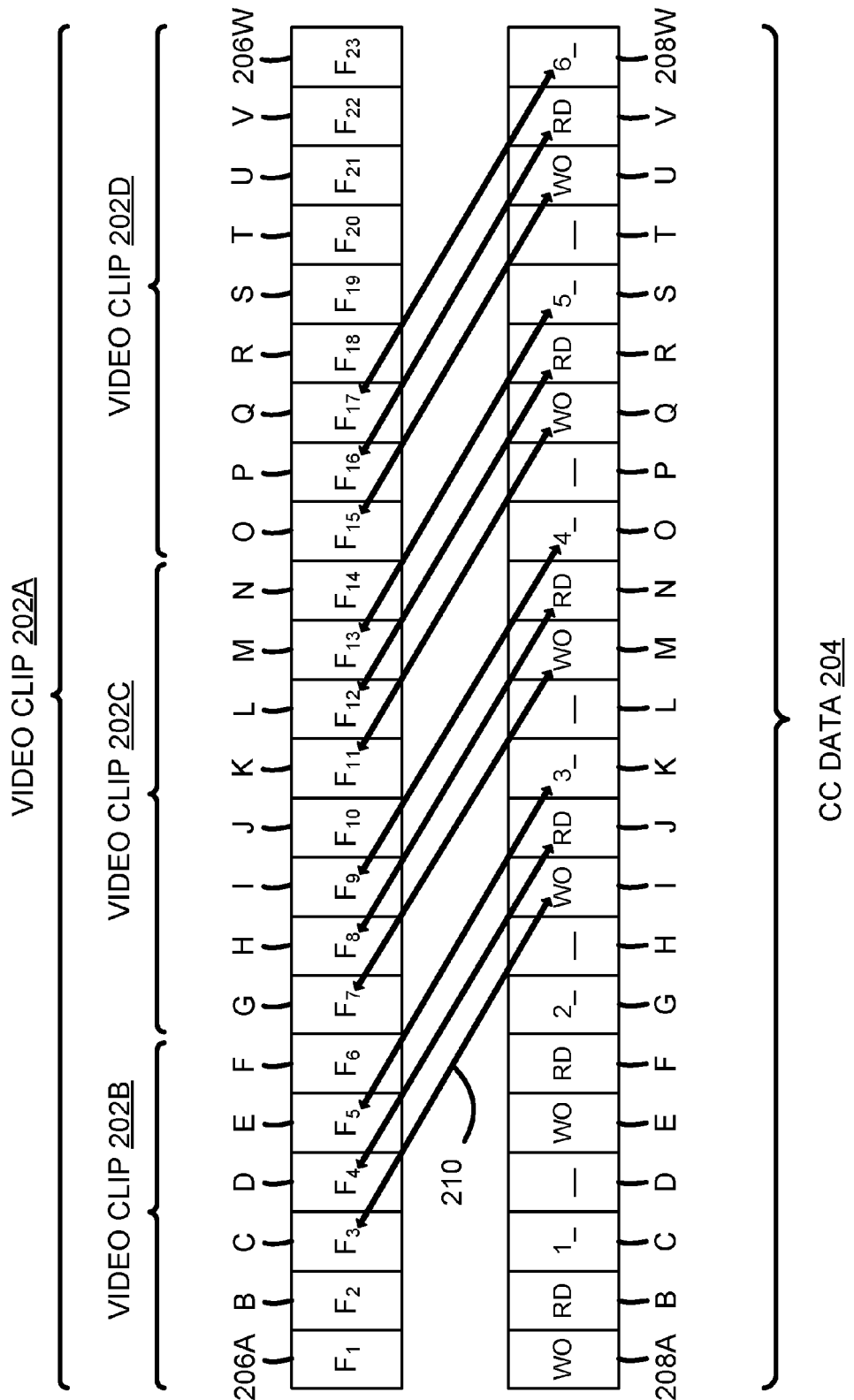

SYSTEMS AND METHODS FOR GENERATING A VIDEO CLIP AND ASSOCIATED CLOSED-CAPTIONING DATA

CROSS-REFERENCE TO RELATED DISCLOSURES

This disclosure is a continuation of U.S. patent application Ser. No. 15/002,792 filed Jan. 21, 2016, which is a continuation of U.S. patent application Ser. No. 13/834,002 filed Mar. 15, 2013 (now U.S. Pat. No. 9,277,199 issued Mar. 1, 2016).

USAGE AND TERMINOLOGY

Throughout this application, with respect to all reasonable derivatives of such terms, and unless otherwise specified (and/or unless the particular context clearly dictates otherwise), each usage of:
"a" or "an" is meant to read as "at least one."
"the" is meant to read as "the at least one."
the term "video" refers to any material represented in a video format (i.e., having multiple frames). In some instances, video may include multiple sequential frames that are identical or nearly identical, and that may give the impression of a still image. Video may or may not include an audio portion.

TECHNICAL FIELD

The disclosed systems and methods relate generally to video and closed-captioning.

BACKGROUND

Closed-captioning (CC) is a video-related service that was developed for the hearing-impaired. When CC is enabled, video and text representing an audio portion of the video are displayed as the video is played. The text may represent, for example, spoken dialog or sound effects of the video, thereby helping a viewer to comprehend what is being presented in the video. CC may also be disabled such that the video may be displayed without such text as the video is played. In some instances, CC may be enabled or disabled while a video is being played.

CC captioning text may be generated in a variety of manners. For example, an individual may listen to an audio portion of video and manually type out corresponding text. As another example, a computer-based automatic speech-recognition system may convert spoken dialog from video to text.

Once generated, CC text may be encoded and stored in the form of CC data. CC data may be embedded in or otherwise associated with the corresponding video. For example, for video that is broadcast in an analog format according to the National Television Systems Committee (NTSC) standard, the CC data may be stored in line twenty-one of the vertical blanking interval of the video, which is a portion of the television picture that resides just above a visible portion. Storing CC data in this manner involves demarcating the CC data into multiple portions (referred to herein as "CC blocks") such that each CC block may be embedded in a correlating frame of the video based on a common processing time. In one example, a CC block represents two characters of text. However a CC block may represent more or less characters.

For video that is broadcast in a digital format according to the Advanced Television Systems Committee (ATSC) standard, the CC data may be stored as a data stream that is associated with the video. Similar to the example above, the CC data may be demarcated into multiple CC blocks, with each CC block having a correlating frame of the video based on a common processing time. Such correlations may be defined in the data stream. Notably, other techniques for storing video and/or associated CC data are also possible.

A receiver (e.g., a television) may receive and display video. If the video is encoded, the receiver may receive, decode, and then display each frame of the video. Further, the receiver may receive and display CC data. In particular, the receiver may receive, decode, and display each CC block of CC data. Typically, the receiver displays each frame and a respective correlating CC block as described above at or about the same time.

SUMMARY

In one aspect, a method involves (i) accessing a first video clip demarcated into contiguous frames; (ii) accessing closed-captioning (CC) data demarcated into contiguous CC blocks, wherein each of the frames correlates to a respective one of the CC blocks according to a common processing time; (iii) identifying a starting frame from among the contiguous frames; (iv) determining a first set of contiguous frames that are within a range of the identified starting frame; (v) determining a first set of CC blocks that correlate to the determined first set of contiguous frames; (vi) providing for presentation the determined first set of CC blocks; (vii) receiving a selection of a starting position from among the provided first set of CC blocks; (viii) identifying an ending frame among the contiguous frames; (ix) using the identified ending frame to identify an ending position from among the accessed CC data; and (x) generating a second video clip and associated CC data, wherein the second video clip includes the frames of the accessed first video clip spanning from the identified starting frame to the identified ending frame, and wherein the generated CC data includes the CC blocks of the accessed CC data spanning from the selected starting position to the identified ending position.

In another aspect, a video processing system is disclosed. The video processing system includes a computer-readable medium having stored thereon program instructions that when executed cause the video processing system to perform a set of functions. The set of functions includes: (i) accessing a first video clip demarcated into contiguous frames; (ii) accessing CC data demarcated into contiguous CC blocks, wherein each of the frames correlates to a respective one of the CC blocks; (iii) identifying a starting frame from among the contiguous frames; (iv) determining a first set of contiguous frames that are within a range of the identified starting frame; (v) determining a first set of CC blocks that correlate to the determined first set of contiguous frames; (vi) providing for presentation the determined first set of CC blocks; (vii) receiving a selection of a starting position from among the provided first set of CC blocks; (viii) identifying an ending frame among the contiguous frames; (ix) using the identified ending frame to identify an ending position from among the accessed CC data; and (x) generating a second video clip and associated CC data, wherein the second video clip includes the frames of the accessed first video clip spanning from the identified starting frame to the identified ending frame, and wherein the generated CC data includes the CC blocks of the accessed CC data spanning from the selected starting position to the identified ending position.

In another aspect, a video processing system is disclosed. The video processing system includes a user interface, an output device, and a computer-readable medium having stored thereon program instructions that when executed cause the video processing system to perform a set of functions. The set of functions includes: (i) accessing a first video clip demarcated into contiguous frames; (ii) accessing CC data demarcated into contiguous CC blocks, wherein each of the frames correlates to a respective one of the CC blocks according to a common processing time; (iii) identifying a starting frame from among the contiguous frames; (iv) determining a first set of contiguous frames that are within a range of the identified starting frame; (v) determining a first set of CC blocks that correlate to the determined first set of contiguous frames; (vi) providing for presentation on the output device the determined first set of CC blocks; (vii) receiving via the user interface a selection of a starting position from among the provided first set of CC blocks; (viii) identifying an ending frame among the contiguous frames; (ix) using the identified ending frame to identify an ending position from among the accessed CC data; and (x) generating a second video clip and associated CC data, wherein the second video clip includes the frames of the accessed first video clip spanning from the identified starting frame to the identified ending frame, and wherein the generated CC data includes the CC blocks of the accessed CC data spanning from the selected starting position to the identified ending position.

BRIEF DESCRIPTION OF THE DRAWINGS

FIG. 2 is a simplified block diagram of an example video clip and closed-captioning data.

DETAILED DESCRIPTION OF THE DRAWINGS

I. Overview

Figure 1:
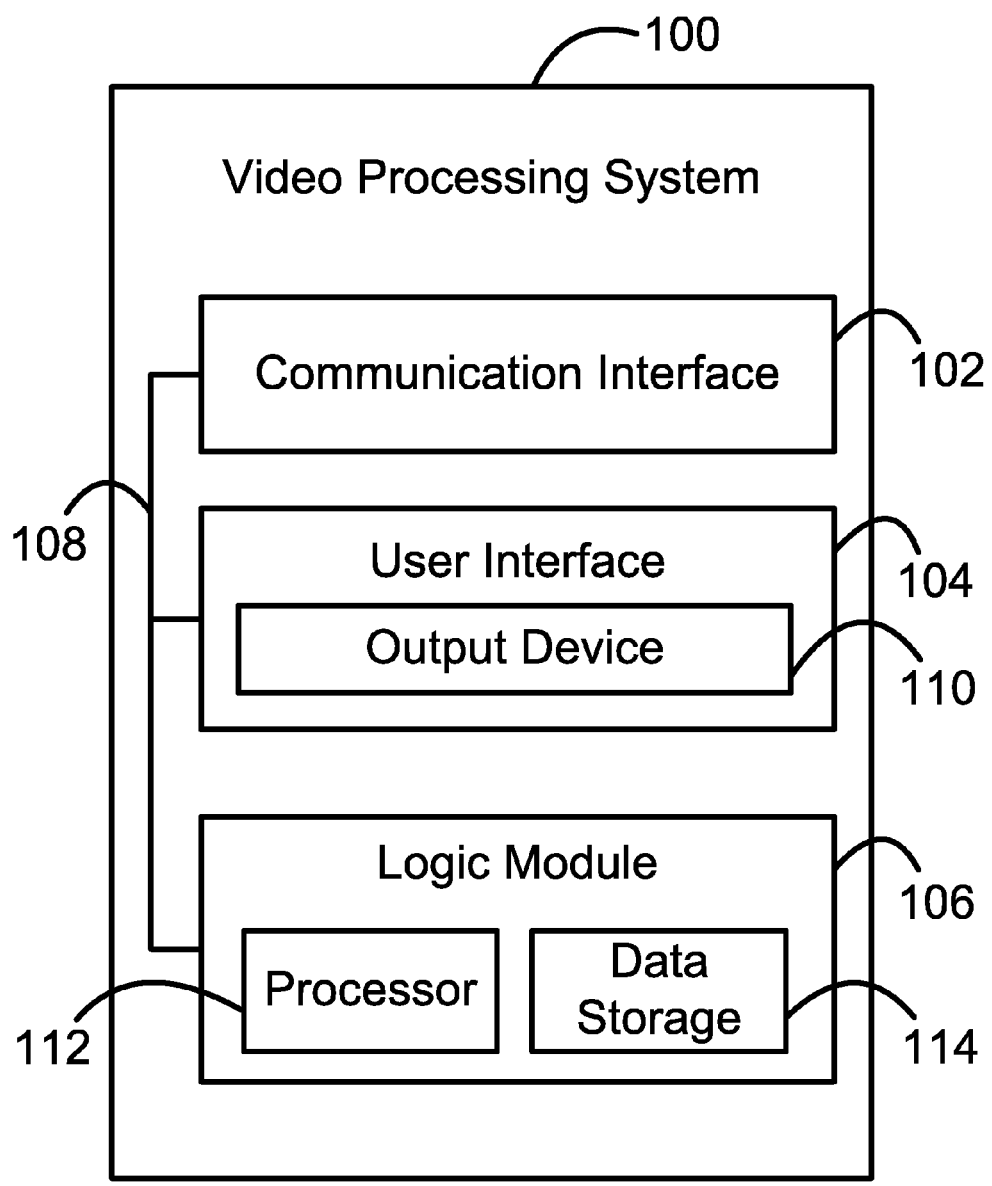
FIG. 1 is a simplified block diagram of an example video processing system.

As discussed above, the correlation between a frame and a CC block may be based on a common processing time, such as when a CC encoder processes a received frame and a received CC block together. In some instances, a frame and a CC block may also be correlated based on a logical association (e.g., where the CC block represents a portion of dialog spoken in the frame). In such an example, a video's CC is sometimes referred to as being "in sync." However, in some instances, a frame and a CC block that are correlated based on a common processing time may not be correlated based on a logical association. In such an example, the video's CC is sometimes referred to as being "out of sync."

CC may be out of sync for a variety of reasons. For example, where a television-broadcasting system both produces and broadcasts video at approximately the same time (commonly referred to as "live" video), an individual may use a stenograph or other device to generate the CC text for the video as it is being produced. However, delays caused by human reaction time and/or electronic processing time typically result in CC text being generated at least a few seconds after the corresponding portion of video is produced. As a result, a frame and a CC block that are processed at the same time (e.g., by an encoder device) may be offset by a few seconds with respect to their logical association.

Notably, this offset may change over the duration of a video as the delays discussed may vary as the video is being produced. For example, if a stenographer struggles with a particular phrase, the delay may be significant for a brief period, but may then be reduced once the stenographer has an opportunity to catch up.

Viewers generally prefer when CC is in sync (or perhaps out of sync but with a minimal offset). When CC is out of sync with an appreciable offset, a viewer may be confused and/or have trouble comprehending the content being presented. However, in some instances, the issue may be more problematic.

Consider an example relating to a video clip A and a video clip B. As used herein, the term video clip refers to a portion of continuous video. In this example, the video clip A is a news program that includes multiple segmented news stories, one of which is the video clip B. As such, the video clip B is a subset of the video clip A.

In this example, the video clip A (and therefore the video clip B) is formatted according to the NTSC standard and therefore frame includes embedded CC data. However, the CC is out of sync with an offset of five seconds. As such, in the video clip A, a given frame C has embedded therein a CC block that is logically associated with a frame D that is positioned five seconds before the frame C. As such, when the video clip A is displayed to a viewer and CC is enabled, the displayed CC text may be logically behind by five seconds as the video clip A it is being played.

Now consider that a video editing system cuts or copies the video clip B from the video clip A such that the video clip B is a stand-alone video clip configured to be broadcast separately. In this instance, since the CC data is embedded in the video, both the frames and the embedded CC blocks are cut or copied together. As a result, when the video clip B is broadcast and displayed for a viewer and CC enabled, the initial frame is displayed together with a CC block that logically correlates to a frame that is not even part of the video clip B. This may create an even greater likelihood that a viewer may be confused and/or have trouble comprehending the content being presented.

In one example, the disclosed systems and methods involve generating a video clip with associated CC data such that frames of the video clip are logically associated with CC blocks of the CC data. In one example method, in response to a user selecting starting and ending frames from a first video clip that define the bounds of a second video clip, a video processing system may determine and display CC data within a range of each selected frame. As such, the user may select custom tailored starting and ending positions of CC data that logically correlate to the selected frames. Then, the video processing system may generate a second video clip and associated CC data, where the second video clip includes the frames of the first video clip spanning from the starting frame to the ending frame, and where the generated CC data includes the CC data of the first video clip spanning from the logical starting position to the logical ending position. The generated second video clip is therefore logically correlated to the generated CC data.

II. Example Video Processing System

FIG. 1 is a simplified block diagram of a video processing system 100 arranged to implement functions in accordance with examples described herein. The video processing system 100 may take any of a variety of forms, including for example a laptop or a desktop computer.

As shown, the video processing system 100 may include a communication interface 102, a user interface 104, and a logic module 106, all of which may be coupled together by a system bus, network, or other connection mechanism 108.

The communication interface 102 may include one or more inputs and one or more outputs configured for receiving and sending video. Further, the communication interface 102 may include a wired or wireless network communication interface for communicating with other devices.

The user interface 104 may facilitate interaction with a user of the video processing system 100 if applicable. As such, the user interface 104 may include an output device 110 such as a display screen or speaker, and an input device such as a mouse, keyboard, or touch-sensitive screen.

The logic module 106 may take the form of a processor 112 and a data storage 114. The processor 112 may include one or more general-purpose processors (e.g., microprocessors) and/or special-purpose processors (e.g., digital signal processors and/or application specific integrated circuits) and may be integrated in whole or in part with the communication interface 102 and/or the user interface 104.

The data storage 114 may include one or more volatile and/or non-volatile storage components and may be integrated in whole or in part with the processor 112. The data storage 114 may take the form of a non-transitory computer-readable medium and may contain program instructions, that when executed by the processor 112, cause the video processing system 100 to perform one or more of the functions described herein. The data storage may be used to store other data, including for example, a video clip that the video processing device 100 may receive or send, such as via the communication interface 102 to another device.

III. Example Video Clip

FIG. 2 is a representation of a video clip 202A and associated CC data 204. The video clip 202A is demarcated into contiguous frames 206A-W. The video clip 202A consists of three additional video clips 202B-D, and therefore each of the video clips 208B-D is a subset of the video clip 202A. Video clip 202B spans from frame 206A to frame 206F, video clip 202C spans from frame 208G to frame 206N, and video clip 202D spans from frame 206O to frame 206W.

The CC data 204 is demarcated into CC blocks 208A-W. In the example provided, each CC block represents two characters of text. A character may include a common printable character such as "A" or "1", a space (represented herein as "_" for clarity), and/or special characters such as one indicating an "end of line" or a "return" character. In some instances, a CC block may represent more or less characters (e.g., an entire CC block may represent one "return" character).

Each of the frames 206 correlates to a respective one of the CC blocks 208 based on a common processing time, but not based on a logical association. For example, frame 206A correlates to CC block 206A, frame 206B correlates to CC block 206B, and so forth. In one example, each of the CC blocks 204 may be embedded in a respective correlating frame 206 (e.g., in line twenty-one of the vertical blanking interval of the frame). In another example, each CC block may be stored in a data stream packaged with the video clip 202A. The data stream may provide additional data to indicate to which respective frame each CC block correlates. However, a video clip and associated CC data may be stored and/or maintain representations of correlations in other manners.

In the example video clip 202A, each frame 206 is negatively offset by six frames from its logically correlating CC block 208. As such, the frame 206C has a logically correlating CC block 208I, the frame 206D has a logically correlating CC block 208J, and so forth. The logical correlations for select frames and CC blocks are represented in FIG. 2 with a double-arrowed line 210.

Due to the offset, if the video clip 208C were to be cut or copied from the video clip 202A and broadcast by itself the CC data "2_WORD3_WORD" would be displayed while the video clip 202C is displayed. This is undesirable as select portions of the displayed CC data (e.g., "WORD 3") do not logically correlate to any portion of the video clip 208C. Further, other portions of the displayed data (e.g., the final term "WORD") may display a time that does not represent the logical correlation as discussed above. An example method for addressing these and other issues is discussed below.

IV. Example Method

Figure 3A:
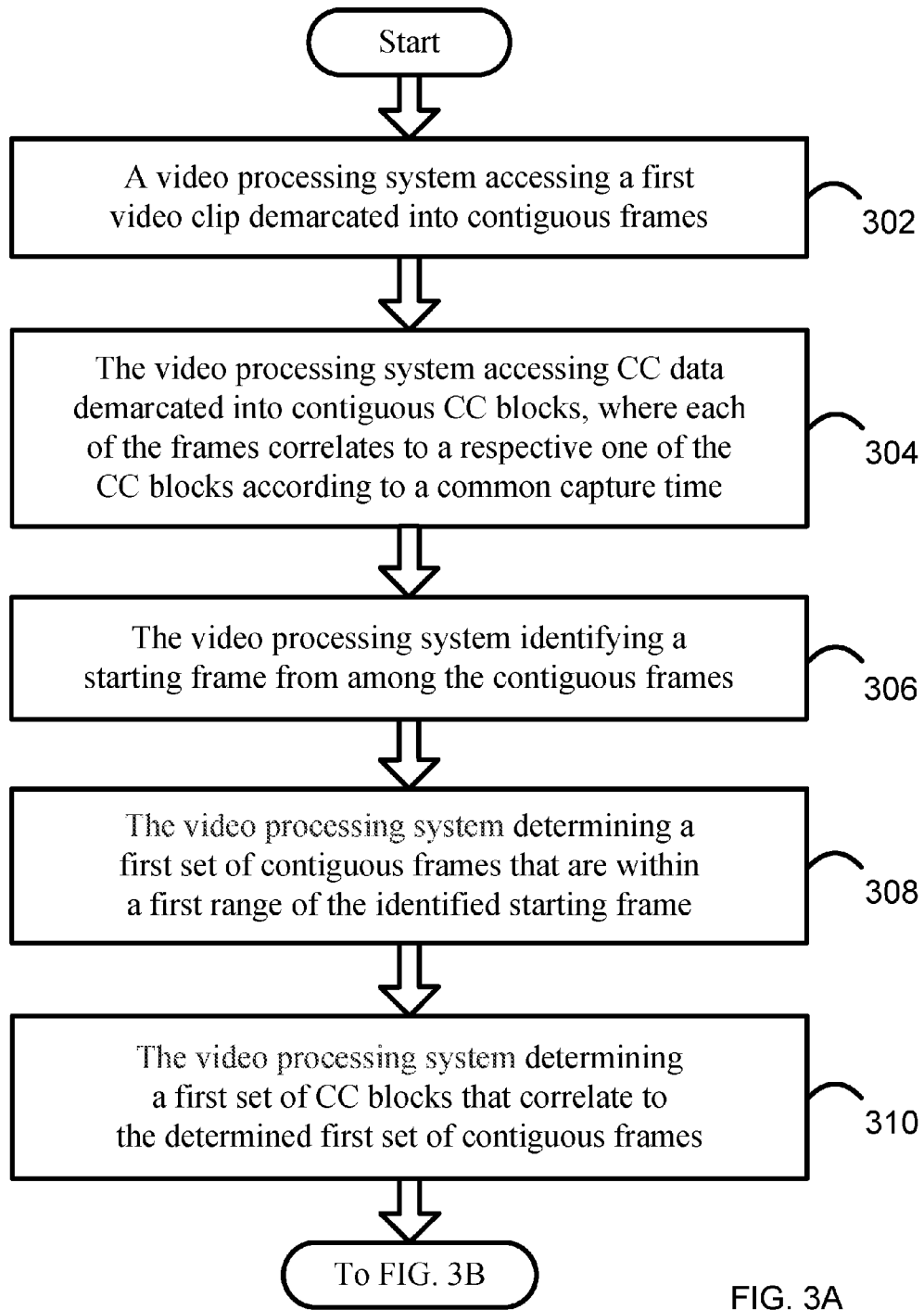
FIG. 3A is a first part of a flow chart illustrating functions in accordance with an example method.
Figure 3B:
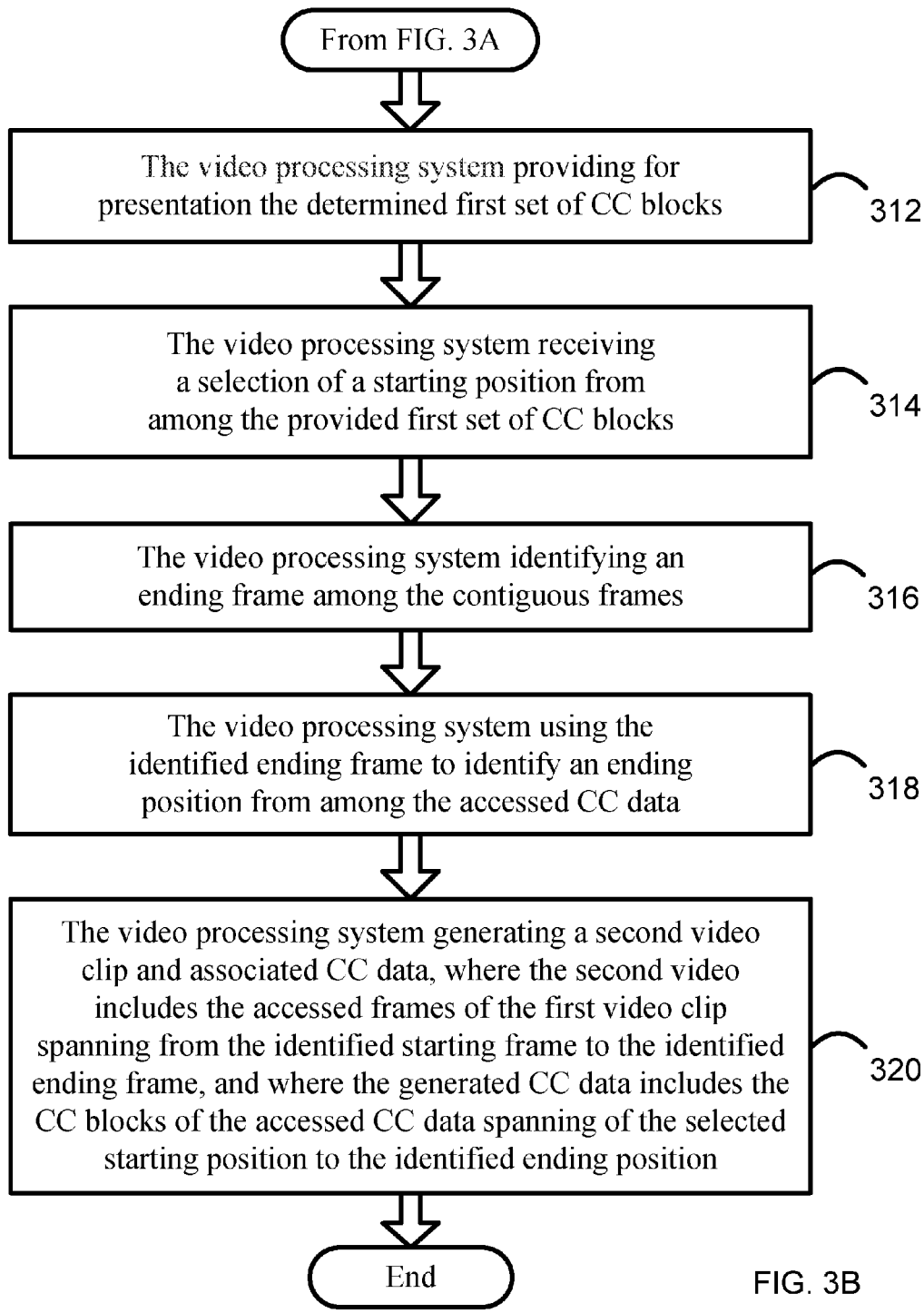
FIG. 3B is a second part of the flow chart of FIG. 3A.

FIG. 3 shows a flow chart illustrating functions in accordance with an example method. At block 302, the method may involve a video processing system accessing a first video clip demarcated into contiguous frames. For example, the video processing system 100 may access the video clip 202A demarcated into the contiguous frames 206A-W.

At block 304, the method may involve the video processing system accessing CC data demarcated into contiguous CC blocks, where each of the frames correlates to a respective one of the CC blocks according to a common processing time. For example, the video processing system 100 may access the CC data 204 demarcated into the contiguous CC blocks 208A-W, where each of the frames 206A-W correlates to a respective one of the CC blocks 208A-W according to a common processing time.

As noted above, each of the CC blocks 208 may be stored together with the respective correlating frame 206 (e.g., as part of the frame's vertical blanking interval). In such an instance, the video processing system 100 may access the video clip 202A and the CC data 204 substantially at the same time. However, the CC blocks 208 may also be stored in other manners and/or the video processing system 100 may access the video clip 202A and the CC data 204 in different manners (e.g., in serial fashion).

At block 306, the method may involve the video processing system identifying a starting frame from among the contiguous frames. For example, the video processing system 100 may identify the frame 206G as the starting frame from among the contiguous frames 206A-W.

The function at block 306 may involve the video processing system presenting a representation of the contiguous frames such that an output device may display the contiguous frames. Further, the function at block 306 may involve the video processing system receiving via a user interface a selection of the starting frame. For example, the video processing system 100 may present a representation of the contiguous frames 206A-W such that the output device 110 may display the contiguous frames 206A-W, and the video processing system 100 may receive via the user interface 104 a selection of the starting frame 206G.

In the alternative, the function at block 306 may involve the frame processing device determining that the starting frame is associated with a starting frame indicator. For example, the frame processing device 100 may determine that the frame 206G is associated with a staring frame indicator, which may have been provided by an automation system that analyzed the video clip 202A, for example.

At block 308, the method may involve the video processing system determining a first set of contiguous frames that are within a first range of the identified starting frame. The first range may be defined according to a first bound and a second bound. The range may then include frames within the two bounds (inclusive or exclusive of the bounds themselves).

For example, the first bound may be a frame that is two frames before the identified starting frame and the second bound may be a frame that is eight frames after the identified starting frame. As such, the first may range includes two frames before and eight frames after the identified starting frame, and therefore the video processing system 100 may determine that the frames 206E-O are a first set of contiguous frames. Note that further details relating to how a given range may be set are discussed below. Also, it should be noted that a number of frames and a duration (e.g., in seconds) may be interchanged depending on the frame-rate being used in the video clip.

At block 310, the method may involve the video processing system determining a first set of CC blocks that correlate to the determined first set of contiguous frames. For example, the video processing system 100 may determine that the first set of CC blocks 208E-O correlate to the frames 208E-O, and therefore that the frames 208E-O are the determined first set of contiguous frames.

In one example, the video processing system determining the first set of CC blocks that correlates to the determined first set of contiguous frames may involve using a report that maps each one of the frames to the correlating one of the CC blocks. In one example, the video processing system may be configured to record video and may generate such a report contemporaneously while recording the video clip.

At block 312, the method may involve the video processing system providing for presentation the determined first set of CC blocks. For example, the video processing system 100 may provide for presentation the CC blocks 208E-O. The method may further involve an output device outputting the provided first set of CC blocks (as a single text string). For example, the output device 110 may output "WORD2_WORD3_WORD 4_".

At block 314, the method may involve the video processing system receiving a selection of a starting position from among the provided first set of CC blocks. This allows a user to indicate where the CC data for a video clip to be generated should start. For example, the user may determine that "WORD 4" is the first word of CC data that logically correlates to the video clip 208C. As such, the video processing system 100 may receive a selection from the user via the user interface 104 of a starting position immediately before the character "W" in the CC block 208M. Note that in some instances, such a selection may be made in a different manner. For example, a user may select a particular word or CC block rather than a position before or after a particular character.

At block 316, the method may involve the video processing system identifying an ending frame among the contiguous frames. For example, the video processing system 100 may identify a frame 206N as an ending frame among the contiguous frames 206A-W.

In one example, the video processing system 100 may identify the ending frame in a manner similar to the video processing system identifying the starting frame as described above. For example, the video processing system 100 may receive from a user via the user interface 104 a selection of frame 206N.

At block 318, the method may involve the video processing system using the identified ending frame to identify an ending position from among the accessed CC data. In one example, the video processing system may identify the ending position in a manner similar to the video processing system identifying the starting position as described above. As such, the function at block 318 may involve the video processing system determining a second set of contiguous frames that are within a second range of the identified ending frame, determining a second set of CC blocks that correlate to the determined second set of contiguous frames, providing for presentation the determined second set of CC blocks, and receiving a selection of an ending position from among the determined second set of CC blocks.

For example, where the second range includes two frames before and eight frames after the identified ending frame 206N, the video processing system 100 may determine frames 206L-V as a second set of contiguous frames. Further, the video processing system 100 may determine that the second set of contiguous CC blocks 208L-V correlate to the second set of contiguous frames 206L-V and may provide for presentation the second set of contiguous CC blocks 208 L-V, such that the output device 110 may output "_WORD4_WORD5_WORD". As with the starting position of the CC data as described above, this allows a user to indicate where the CC data for the video clip to be generated should end. For example, the user may determine that "WORD 5" is the last word of CC data that logically correlates to the video clip 208C. As such, the video processing system 100 may receive a selection from the user via the user interface 104 of an ending position immediately after the character "4" in the CC block 208S.

At block 320, the method may involve the video processing system generating a second video clip and associated CC data, where the second video clip includes the frames of the accessed first video clip spanning from the identified starting frame to the identified ending frame, and where the generated CC data includes the CC blocks of the accessed CC data spanning from the selected starting position to the identified ending position.

Figure 4:
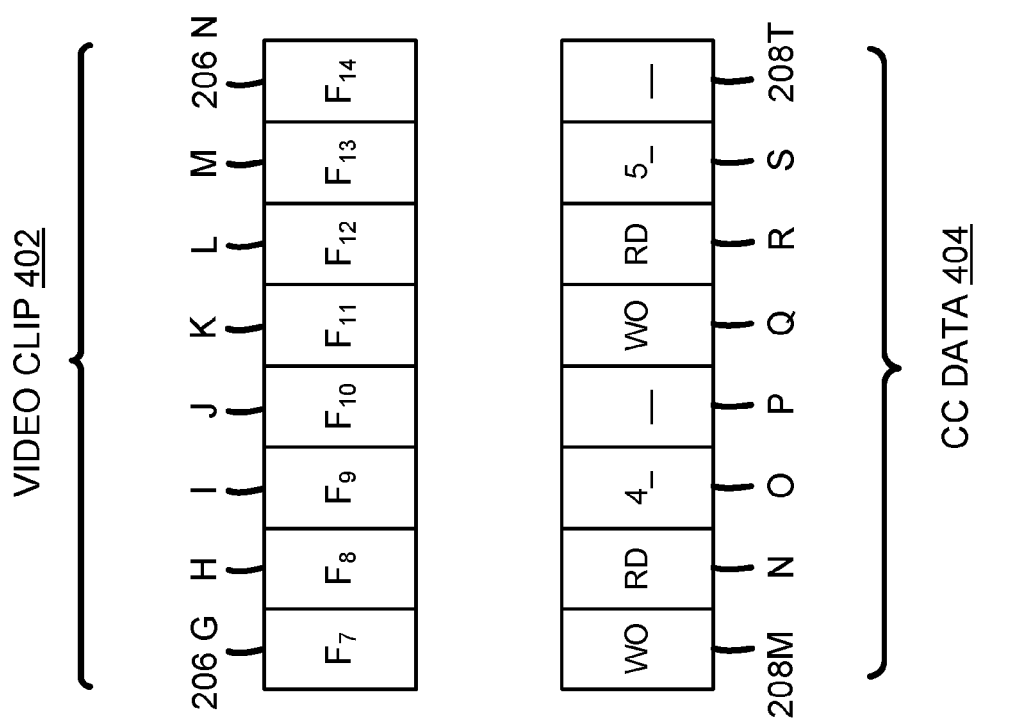
FIG. 4 is a simplified block diagram of an example video clip generated as a result of an example method being performed.

For example, as shown in FIG. 4, the video processing system 100 may generate a video clip 402 and associated CC data 404. The video clip 402 includes the frames of the accessed video clip 202A spanning from the identified starting frame 206G to the identified ending frame 206N (i.e., the frames 206G-N). Further the generated CC data 404 includes the CC blocks 208 of the accessed CC data 204 spanning from the selected starting position immediately before the character "W" in CC block 208M to the identified ending position immediately after the character "5" in CC block S.

In some instances where a length of the generated CC data is less than or greater than a length that corresponds to the generated video clip (i.e., based on the CC block size for each frame), the video processing system may employ a linear mapping technique such that the generated CC data may be proportionally expanded or contracted such that the generated CC data may appropriately align with the generated video clip. In addition or in the alternative, select CC data may be truncated, or perhaps additional CC data (e.g., spaces) may be added to the generated CC data. As shown in FIG. 4, CC block 208T having two spaces has been added to the generated CC data 404. Further in addition or in the alternative, the rate at which CC data is provided to a CC encoder may be adjusted (sped up or slowed down) to appropriately align the CC data with the generated video clip.

As such, the video clip 402 may have associated CC data that is correlated not only based on processing time (i.e., when the video clip 202A is created), but also correlated based on a logical association. The resulting video clip 202A is therefore likely to provide an improved experience for a viewer when CC is enabled.

Notably, the associated CC data may be stored together with the video clip 402 in the manners described above, however the video clip and/or the CC data may be represented in other manners. For example, the CC data may be stored in a separate file such as an XML file such that the video clip and the XML file may be provided to a software video player configured for decoding the video clip and the CC data. Such techniques may be used, for example, when a video clip is sought to be broadcast on the Internet where an Internet-based software video may be configured to process such files to facilitate the playing of video clip and associated CC data in such formats. However, other formats of video files and CC data may also be used as desired.

V. Example Variations

The examples provided above are for illustration purposes only and are not meant to be limiting. It is appreciated that the disclosed systems and method could be varied without departing from the scope of the invention. For example, different first and/or second ranges as discussed above could be used to change the CC data presented to a user (i.e., so that the user can select a starting and ending position of the CC data). In one example, the ranges may be set such that the CC data presented to the user reflects a "shift" based on a likely and/or expected offset.

In the example above where the offset between each frame and its logically correlating CC block is six frames, the first range may include frames spanning from the identified starting frame to six frames after the identified starting frame. However, since the offset may not always be constant throughout a video clip, the range may further be expanded to enable a user to select an appropriate starting and ending position of the CC data. As such, as provided in the example above, the first range may extend from two frames before the identified starting frame to eight frames after the identified starting frame. Likewise, the second range may extend from two frames before the identified ending frame to eight frames after the identified ending frame.

More generally, with respect to the first range, the first bound may be a first displacement before the identified starting frame and the second bound may be a second displacement after the identified ending frame. As noted, such ranges may also be referenced in terms of time (e.g., seconds). The same concept and values may also be applicable to the second range.

As indicated above, the video clip 202A is provided for illustration, and does not necessarily reflect a common video clip, such as with respect to duration, offsets, etc. Indeed, in a real-world example, an offset may more likely be in a range of two to six seconds and in many instances approximately four seconds. Also, in one example, the desired expansion of the range may be approximately five seconds in each direction. As such, in one example, by combining these concepts, the first displacement may be a value in a range from zero to three seconds, and in a more particular example, the first displacement may be approximately one second. Further, in one example, the second displacement may be a value in a range from eight to ten seconds, and in a more particular example, the second displacement may be approximately nine second.

While one or more functions of the disclosed methods have been described as being performed by the certain entities (e.g., the video processing system 100), the functions may be performed by any entity. Further, the steps described throughout this application need not be performed in the disclosed order, although in some examples, an order may be preferred. Also, not all steps need to be performed to achieve the desired advantages of the disclosed systems and methods, and therefore not all steps are required. As such, example methods may include any subsets of the example method provided above. Further, the variations described throughout this disclose may be applied to any of the disclosed systems or methods.

Further, while select examples have been described, alterations and permutations of these examples will be apparent to those of ordinary skill in the art. Other changes, substitutions, and alterations are also possible without departing from the disclosed systems and methods in its broader aspects as set forth in the following claims.

The invention claimed is:

1. A method comprising:
accessing a first video clip demarcated into frames;
accessing closed-captioning (CC) data demarcated into CC blocks, wherein each of the frames correlates to a respective one of the CC blocks;
identifying a first frame from among the frames;
determining a first set of CC blocks that correlate to a first set of frames within a range of the identified first frame;
identifying a first position from among the determined first set of CC blocks;
identifying a second frame from among the frames;
using the identified second frame to identify a second position from among the accessed CC data; and
generating a second video clip and associated CC data, wherein the second video clip includes the frames of the accessed first video clip spanning from the identified first frame to the identified second frame, and wherein the generated CC data includes the CC blocks of the accessed CC data spanning from the identified first position to the identified second position.

2. The method of claim 1, further comprising presenting a representation of the frames, wherein identifying the first frame from among the frames comprises receiving via a user interface a selection of the first frame.

3. The method of claim 1, wherein identifying the first frame from among the frames comprises determining that the first frame is associated with a first frame indicator.

4. The method of claim 1, wherein the range of the identified first frame consists of a set of frames between a first bound and a second bound, wherein the first bound is a first displacement before the identified first frame and the second bound is a second displacement after the identified first frame, wherein the first displacement is a value in a range from zero to three seconds, and wherein the second displacement is a value in a range from eight to ten seconds.

5. The method of claim 4, wherein the first displacement is approximately one second and the second displacement is approximately nine seconds.

6. The method of claim 1, further comprising generating a report of the first video clip that provides a mapping of each one of the frames to the correlating one of the CC blocks, wherein determining the first set of CC blocks that correlates to the first set of frames comprises using the generated report to determine the first set of CC blocks that correlate to the first set of frames.

7. The method of claim 6, further comprising recording the first video clip, wherein generating the report of the first video clip occurs contemporaneously while recording the first video clip.

8. The method of claim 1, wherein the identified first frame is associated with a first processing time, the first position selected from among the presented first set of CC blocks is associated with a second processing time, and the first and second processing times are different.

9. The method of claim 1, wherein the range is a first range, and wherein using the identified second frame to identify the second position from among the accessed CC data comprises:
determining a second set of frames that are within a second range of the identified second frame;
determining a second set of CC blocks that correlate to the determined second set of frames;
providing for presentation the determined second set of CC blocks; and
receiving a selection of the second position from among the determined second set of CC blocks.

10. The method of claim 1, wherein generating the second video clip and the associated CC data comprises employing a linear mapping technique to proportionally expand or contract the generated CC data to match the frames of the generated second video clip.

11. A video processing system comprising:
one or more processors; and
a computer-readable medium having stored thereon program instructions that when executed by the one or more processors cause the video processing system to perform a set of functions comprising:
accessing a first video clip demarcated into frames;
accessing closed-captioning (CC) data demarcated into CC blocks,
wherein each of the frames correlates to a respective one of the CC blocks;
identifying a first frame from among the frames;
determining a first set of CC blocks that correlate to a first set of frames within a range of the identified first frame;
identifying a first position from among the determined first set of CC blocks;
identifying a second frame among the frames;
using the identified second frame to identify a second position from among the accessed CC data; and
generating a second video clip and associated CC data, wherein the second video clip includes the frames of the accessed first video clip spanning from the identified first frame to the identified second frame, and wherein the generated CC data includes the CC blocks of the accessed CC data spanning from the identified first position to the identified second position.

12. The video processing system of claim 11, the set of functions further comprising presenting a representation of the frames, wherein identifying the first frame from among the frames comprises receiving via a user interface a selection of the first frame.

13. The video processing system of claim 11, wherein identifying the first frame from among the frames comprises determining that the first frame is associated with a first frame indicator.

14. The video processing system of claim 11, wherein the range of the identified first frame consists of a set of frames between a first bound and a second bound, wherein the first bound is a first displacement before the identified first frame and the second bound is a second displacement after the identified first frame, wherein the first displacement is a value in a range from zero to three seconds, and wherein the second displacement is a value in a range from eight to ten seconds.

15. The video processing system of claim 14, wherein the first displacement is approximately one second and the second displacement is approximately nine seconds.

16. The video processing system of claim 11, the set of functions further comprising generating a report of the first video clip that provides a mapping of each one of the frames to the correlating one of the CC blocks, wherein determining the first set of CC blocks that correlates to the first set of frames comprises using the generated report to determine the first set of CC blocks that correlate to the first set of frames.

17. The video processing system of claim 16, the set of functions further comprising recording the first video clip, wherein generating the report of the first video clip occurs contemporaneously while recording the first video clip.

18. The video processing system of claim 11, wherein the identified first frame is associated with a first processing time, the first position selected from among the presented first set of CC blocks is associated with a second processing time, and the first and second processing times are different.

19. The video processing system of claim 11, wherein the range is a first range, and wherein using the identified second frame to identify the second position from among the accessed CC data comprises:
determining a second set of frames that are within a second range of the identified second frame;
determining a second set of CC blocks that correlate to the determined second set of frames;
providing for presentation the determined second set of CC blocks; and
receiving a selection of the second position from among the determined second set of CC blocks.

20. A non-transitory computer-readable medium having stored thereon program instructions that when executed by one or more processors cause performance of a set of functions comprising:
accessing a first video clip demarcated into frames;
accessing closed-captioning (CC) data demarcated into CC blocks, wherein each of the frames correlates to a respective one of the CC blocks;
identifying a first frame from among the frames;
determining a first set of CC blocks that correlate to a first set of frames within a range of the identified first frame;
identifying a first position from among the determined first set of CC blocks;
identifying a second frame from among the frames;
using the identified second frame to identify a second position from among the accessed CC data; and
generating a second video clip and associated CC data, wherein the second video clip includes the frames of the accessed first video clip spanning from the identified first frame to the identified second frame, and wherein the generated CC data includes the CC blocks of the accessed CC data spanning from the identified first position to the identified second position.

* * * * *